US012063150B1

(12) United States Patent
Watson (10) Patent No.: US 12,063,150 B1
(45) Date of Patent: Aug. 13, 2024

(54) QUALITY OF SERVICE MANAGEMENT FOR PREVENTING CLIENT DROP-OFFS

(71) Applicant: Amazon Technologies, Inc., Seattle, WA (US)

(72) Inventor: Ryan F Watson, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 30 days.

(21) Appl. No.: 16/990,796

(22) Filed: Aug. 11, 2020

(51) Int. Cl.
  *H04L 41/5022* (2022.01)
  *G06F 9/48* (2006.01)
  *G06F 9/50* (2006.01)
  *H04L 67/145* (2022.01)
  *H04L 69/163* (2022.01)

(52) U.S. Cl.
  CPC ........ *H04L 41/5022* (2013.01); *G06F 9/4881* (2013.01); *G06F 9/5038* (2013.01); *H04L 67/145* (2013.01); *H04L 69/163* (2013.01)

(58) Field of Classification Search
  CPC ...... G06F 9/4806; G06F 9/4843; G06F 9/485; G06F 9/4881; G06F 9/4887; G06F 9/50; G06F 9/5005; G06F 9/5027; G06F 9/5038; H04L 41/50; H04L 41/5019; H04L 41/5022; H04L 67/145; H04L 69/163; H04L 67/02; H04L 67/14; H04L 67/60; H04L 67/61; H04W 76/25
  See application file for complete search history.

(56) References Cited

U.S. PATENT DOCUMENTS

| 5,761,507 A | * | 6/1998 | Govett | G06F 9/5083 |
| | | | | 718/101 |
| 6,237,024 B1 | * | 5/2001 | Wollrath | G06F 9/485 |
| | | | | 709/203 |

(Continued)

OTHER PUBLICATIONS

Rhee, Yoon-Jung, Eun-Sil Hyun, and Tai-Yun Kim. "Connection management for QoS service on the Web." Journal of Network and Computer Applications 25.1 (2002): 57-68. (Year: 2002).*

(Continued)

*Primary Examiner* — Vivek Srivastava
*Assistant Examiner* — William C McBeth
(74) *Attorney, Agent, or Firm* — Robert C. Kowert; Kowert, Hood, Munyon, Rankin & Goetzel, P.C.

(57) ABSTRACT

A system for quality of service management, including computing resources to provide services implemented at a provider network and network interfaces to establish a plurality of connections to perform tasks on behalf of clients. The system includes a quality of service (QOS) manager to determine respective client drop-off criteria indicating conditions for respective clients to cease communications via respective connections of the connections. The QoS manager also determines task information for respective tasks indicating a size of the respective tasks, a resource requirement for the respective tasks, or priority information for the respective tasks. The QoS manager further adjusts allocations of respective computing resources to the respective connections based on the respective client drop-off criteria and the task information. The QoS manager causes the respective computing resources to implement respective tasks on behalf of the clients according to the adjusted allocations.

20 Claims, 6 Drawing Sheets

(56) References Cited

U.S. PATENT DOCUMENTS

| | | | | |
|---|---|---|---|---|
| 6,594,701 | B1* | 7/2003 | Forin | H04L 47/10 |
| | | | | 711/E12.067 |
| 7,698,115 | B2* | 4/2010 | Voellm | G06F 9/5011 |
| | | | | 703/6 |
| 8,792,491 | B2 | 7/2014 | Jackowski et al. | |
| 9,838,269 | B2 | 12/2017 | Wright et al. | |
| 10,951,742 | B1* | 3/2021 | Morris | G06F 9/50 |
| 10,990,447 | B1* | 4/2021 | Shpiner | H04L 47/805 |
| 2001/0003830 | A1* | 6/2001 | Nielsen | H04L 47/70 |
| | | | | 709/226 |
| 2003/0046396 | A1* | 3/2003 | Richter | G06F 9/505 |
| | | | | 709/226 |
| 2003/0135585 | A1* | 7/2003 | Binder | H04L 67/02 |
| | | | | 709/219 |
| 2005/0188098 | A1* | 8/2005 | Dunk | H04L 67/14 |
| | | | | 709/232 |
| 2006/0036764 | A1* | 2/2006 | Yokota | H04L 67/61 |
| | | | | 709/240 |
| 2006/0200849 | A1* | 9/2006 | Sundarrajan | H04L 69/163 |
| | | | | 725/110 |
| 2007/0088826 | A1* | 4/2007 | Raphel | H04L 67/564 |
| | | | | 709/225 |
| 2007/0136311 | A1* | 6/2007 | Kasten | H04L 67/564 |
| 2007/0276933 | A1 | 11/2007 | Lee et al. | |
| 2007/0280105 | A1 | 12/2007 | Barkay et al. | |
| 2009/0059785 | A1* | 3/2009 | Jogalekar | H04L 47/70 |
| | | | | 370/230 |
| 2009/0077233 | A1* | 3/2009 | Kurebayashi | G06F 9/4843 |
| | | | | 709/224 |
| 2009/0165007 | A1* | 6/2009 | Aghajanyan | G06F 9/4881 |
| | | | | 718/103 |
| 2010/0262695 | A1* | 10/2010 | Mays | G06F 9/5027 |
| | | | | 709/224 |
| 2012/0008536 | A1* | 1/2012 | Tervahauta | H04L 67/145 |
| | | | | 370/311 |
| 2013/0151714 | A1* | 6/2013 | Ralph | H04L 43/10 |
| | | | | 709/227 |
| 2013/0159532 | A1* | 6/2013 | Boero | G06F 9/5027 |
| | | | | 709/226 |
| 2013/0339407 | A1* | 12/2013 | Sharpe | G06F 16/182 |
| | | | | 707/827 |
| 2014/0115150 | A1* | 4/2014 | Ewanchuk | H04L 67/145 |
| | | | | 709/224 |
| 2015/0124698 | A1* | 5/2015 | Jain | H04W 76/25 |
| | | | | 370/328 |
| 2016/0073290 | A1 | 3/2016 | Kakadia et al. | |
| 2016/0150589 | A1* | 5/2016 | Zhao | H04L 67/14 |
| | | | | 370/328 |
| 2019/0158626 | A1* | 5/2019 | Tian | G06F 9/4887 |
| 2020/0202265 | A1* | 6/2020 | Nair | G06F 9/5027 |
| 2021/0011916 | A1* | 1/2021 | Zhou | G06F 9/5083 |

OTHER PUBLICATIONS

Allman, M. et al., "TCP Congestion Control", Internet Engineering Task Force, Requests for Comments 5681, Sep. 2009 (Year: 2009).*

Honda et al., WO 2015/068381 A1, WIPO, May 14, 2015 (Year: 2015).*

Bhatti, Nina, and Rich Friedrich. "Web server support for tiered services." IEEE network 13.5 (1999): 64-71. (Year: 1999).*

De Coninck, Elias, et al. "Dynamic auto-scaling and scheduling of deadline constrained service workloads on IaaS clouds." Journal of Systems and Software 118 (2016): 101-114. (Year: 2016).*

Guitart, Jordi, et al. "Session-based adaptive overload control for secure dynamic web applications." 2005 International Conference on Parallel Processing (ICPP'05). IEEE, 2005. (Year: 2005).*

* cited by examiner

QUALITY OF SERVICE MANAGEMENT FOR PREVENTING CLIENT DROP-OFFS

BACKGROUND

Online services include quality of service management to manage consistent service across multiple clients when resources of the service are unable to perform at full capacity. Individual service throughput to each of the clients may be reduced evenly across the clients without regard to any client-specific requirements. Certain clients may expect prioritization based on pre-arranged designations, such as service level agreements. These clients may be prioritized over lower end clients which might not necessarily have established priority levels. However, when clients are at the same priority level, equal reduction of service would apply.

Another method of quality of service management would be rotating which client has reduced service in a round robin scheduling algorithm. Each client may be prioritized or deprioritized in sequence without regard to their respective priority levels or any tasks being executed for those clients. Clients may end up dropping their connections while waiting for the services to provide any throughput. Each client may have different expectations as to how long they may wait while inactive before their respective connections are dropped due to inactivity. Equal distribution of resources would not take into account these different expectations.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for quality of service management based on client-specific criteria and client-specific tasks is disclosed. A quality of service manager may be implemented for services offered by a provider network. The quality of service manager may determine allocations of computing resources for fulfilling tasks on behalf of respective clients. The quality of service manager may determine the allocations based on client-specific drop-off criteria that represents client tolerances before the client ends up terminating connections to the provider network, such as timing out due to inactivity. The quality of service manager may adjust the allocations such that activity may occur prior to client-specific timeouts. For example, the quality of service manager may determine when to send data to respective clients based on their respective timeout values.

The quality of service manager may also determine the allocations based on information pertaining to the tasks implemented by the computing resources. The tasks may be varied between the clients such that different tasks may require different levels of quality of service management. For example, one client downloading a large file may be deprioritized compared to another client downloading a significantly smaller file. The quality of service manager may prioritize completion of many smaller tasks to allow more tasks to be completed overall. The quality of service manager may allow the services to handle more service requests from clients by reducing the need to reallocate resources to different tasks and switch contexts at a higher operational cost.

The client drop-off criteria may be determined based on monitoring connections to the services. Based on detecting a ceased connection, the client drop-off criteria may be updated to indicate the conditions that may have led to the ceased connection. The updated client drop-off criteria may be used by the quality of service manager to determine the tolerance of the client with respect to termination of the connections.

As used herein, a "quality of service manager" or "QoS manager" may be configured to determine client drop-off criteria for clients, determine task information, adjust allocations of computing resources, cause the computing resources to implement tasks on behalf of the clients, or perform other functions based on computer-executable code executed on or across processors or other computing devices.

As one skilled in the art will appreciate in light of this disclosure, embodiments may be capable of achieving certain technical advantages, including some or all of the following: reducing computational overhead to make a computer run more efficient, reducing memory requirements, improving service throughput while preventing connection timeouts for numerous clients of a service provider network, efficiently determine client drop-off criteria based on historical ceased connections, etc.

Figure 1:
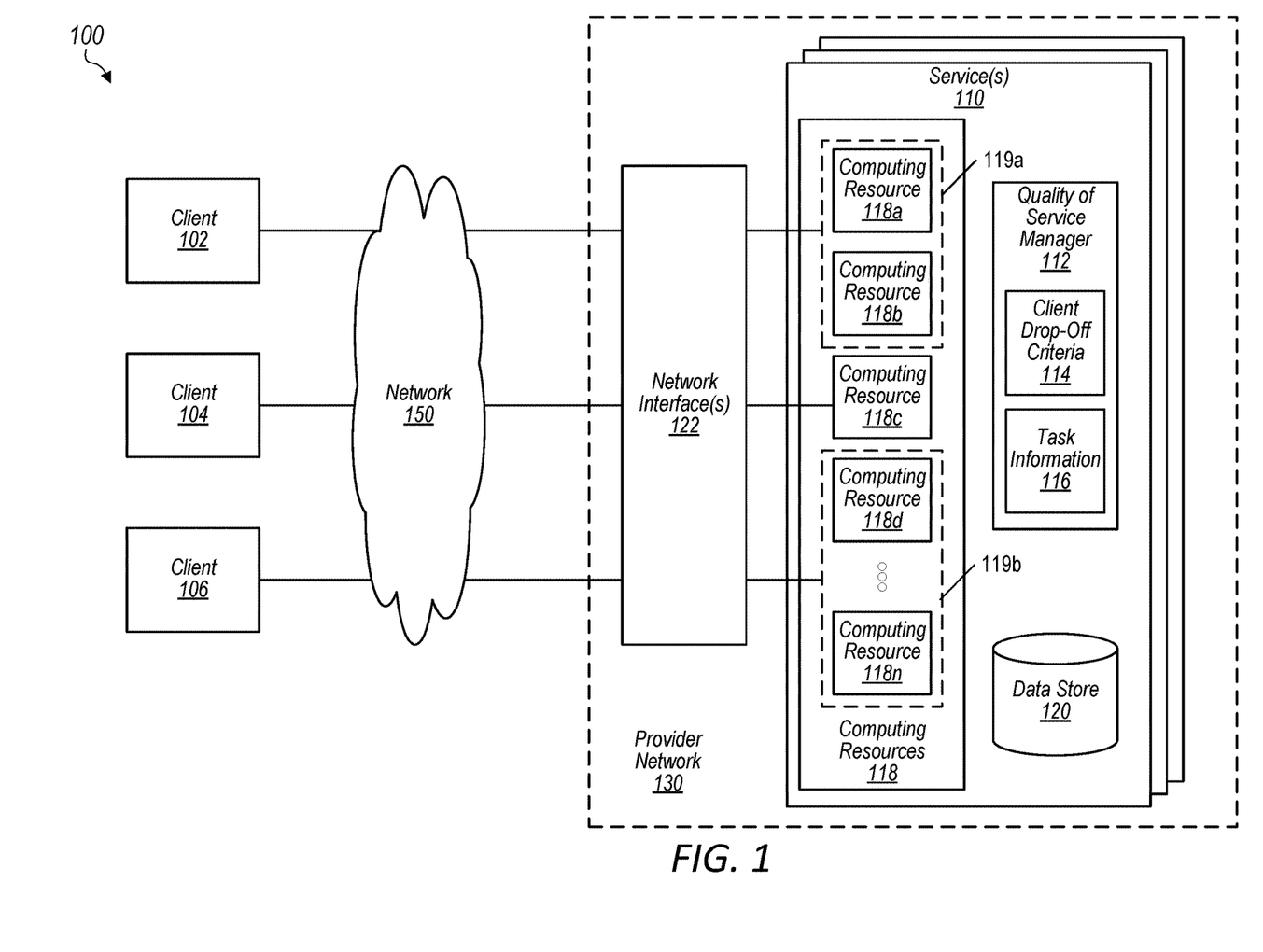
FIG. 1 illustrates a block diagram of a system configured to manage quality of service (QoS) for multiple clients, according to some embodiments.

FIG. 1 illustrates a block diagram of a system 100 configured to manage quality of service (QOS) for multiple clients, according to some embodiments. The system 100 may include a provider network 130 configured to provide one or more services 110 to clients, such as client 102, client 104, and client 106. The services 100 may be implemented using a plurality of computing resources 118, such as computing hardware, computing devices, processors, memories, or other components configured to perform various tasks to fulfill service requests on behalf of the clients. The services 100 may include a quality of service manager 112 configured to manage quality of service for the clients. The quality of service manager 112 may be implemented on or across processors and memories. The quality of service manager 112 may also be implemented as a hardware component coupled to servers used to implement the services 110. The services 110 may also include a network interface 116 configured to establish connections between the services 110 and the clients. The services 110 may also include a data store 120 configured to store information on behalf of the services 110. The provider network 130 may include one or more network interfaces 122 configured to establish connections between the services 110 and the clients 102, 104, and 106 via a network 150.

The client 102, the client 104, and the client 106 may send respective service requests to the services 110 via the network 150 and the network interfaces 122, according some embodiments. For example, the client 102 may send a service request for performing one or more tasks utilizing aspects of the services 110 on behalf of the client 102. The client 104 may send a service request for performing one or more tasks utilizing aspects of the services 110 on behalf of the client 104. Similarly, the client 106 may send a service request for performing one or more tasks utilizing aspects of the services 110 on behalf of the client 106. Such services may include data storage, data downloads, data processing, data backups, data restorations, data transfers, calculations, hosting, or other computing services. For example, the client 102 may send a service request to store data from the client 102 to the data store 120. As another example, the client 102 may send a service request to retrieve data from the data store 120. As yet another example, the client 102 may send a service request to transfer data from one portion (e.g., a table or a database) of the data store 120 to another portion of the data store 120.

The services 110 may allocate a subset of the computing resources 118 in order to fulfill the service request. For example, the subset of the computing resources 118 may be dedicated and configured to perform one or more tasks to fulfill the service request on behalf of the services 110. In some embodiments, the computing resources 118 may include multiple computing resources that are configurable to perform tasks to fulfill service requests at the services 110. For example, the computing resources 118 may include computing resources 118a, 118b, 118c, 118d through 118n, where n may be any integer value for any number of computing resources that may be allocated to respective clients.

In situations in which the services 110 have a sufficient quantity of the computing resources 118 to fulfill all of the service requests, the services 110 may not necessarily adjust allocations of the computing resources 118 used to fulfill the service requests. However, there are situations in which the computing resources 118 may not be sufficient to handle the service requests without additional modifications or adjustments to expected behavior of the computing resources 118. For example, in situations where bandwidth of the services 110 is at maximum utilization, the services 110 may adjust bandwidth usage on a per-client basis, such as by traffic shaping, load shedding, or load balancing. In other situations, a quantity of clients of otherwise equal priority may attempt service requests at a given time such that one or more of the clients may need to be prioritized or deprioritized in order to fulfill any of the service requests. For example, a burst of same-priority clients may cause congestion similar to gridlock that may cause the services 110 to fail at providing service across all of the clients. However, by shifting client priorities or some of computing resources 118, the services 110 may satisfy at least some of the service requests for at least some of the clients. After at least some of the clients have respective service requests fulfilled, a remaining quantity of clients may be able to have those respective service requests fulfilled by the services 110.

The services 110 may include the quality of service manager 112 that is configured to allocate the computing resources 118 to manage quality of service between the clients and monitor connections between the clients and the services 110. For example, the quality of service manager 112 may determine allocations of the computing resources 118 for respective clients. As an illustrative, non-limiting example, the computing resources 118 may be allocated such that a set of computing resources 119a may include the computing resource 118a and computing resource 118b. As another illustrative, non-limiting example, the computing resource 118c may be allocated by the quality of service manager 112 to fulfill service requests on behalf of the client 104 The set of computing resources 119a may be allocated by the quality of service manager 112 to fulfill service requests on behalf of client 102. As another illustrative, non-limiting example, the computing resources 118 may be allocated such that a set of computing resources 119b may include the computing resource 118d through computing resource 118n. The set of computing resources 119b may be allocated by the quality of service manager 112 to fulfill service requests on behalf of client 106.

The quality of service manager 112 may determine or adjust the allocations of the computing resources 118 based on various factors, in some embodiments. For example, the quality of service manager 112 may determine or adjust the allocations of the computing resources 118 based at least in part on client drop-off criteria 114 and/or task information 116. The client drop-off criteria 114 may indicate respective tolerances of respective clients before the respective clients drop their respective connections. The client drop-off criteria 114 may indicate various conditions that, when satisfied, tend to result in respective clients ceasing communications with the services 110. Ceasing communications may include terminating the respective connection, timing out of the respective connection, dropping off of the respective connection, or otherwise closing the respective connection. For example, the client drop-off criteria 114 may indicate that a particular client may time out of a connection after a period of inactivity has elapsed via a respective connection for the particular client to the services 110. The period of inactivity may be indicated by a timeout value as part of the client drop-off criteria 114. The timeout value may be represented as a numerical value that signifies a duration of time or a quantity of clock cycles. In some embodiments, a time buffer may be determined to add a gap between a transmission of data and the timeout value. For example, the time buffer may be determined based on adding a fixed time value to the timeout value to determine when the data should be transmitted before the connection becomes timed out. The time buffer may then be used as a reference point to ensure that data transmissions occur prior to the timeout value. In some situations, heartbeat data or white noise data may be sent to the respective client based on the timeout value and/or the time buffer when the task implemented for the client does not require sending data to the client or receiving data from the client. For example, the task may include copying data within the services 110 such that the client does not necessarily need to receive the data subject to the task.

The quality of service manager 112 may be configured to send one or more data blocks via particular connections in order to prevent the period of inactivity from elapsing. In other embodiments, the computing resources 118 may be configured to send one or more data blocks via particular connections in order to prevent the period of inactivity from elapsing. In some situations, many data blocks may be sent in order to maintain larger transmission control protocol (TCP) windows for connections with higher quality of service.

In other situations, the client drop-off criteria 114 may indicate other conditions in which the respective client may cease communications via the respective connection. For example, the client drop-off criteria 114 may indicate a connection time limit representative of a maximum amount of time which the client may remain connected to the services 110. In some embodiments, the client drop-off criteria 114 may be stored at the data store 120 in a database that includes information pertaining to the clients 102, 104, and 106. The database may store respective client account information that includes the client drop-off criteria 114. The database may alternatively store records about client connections over time in a historical record, connection log, or other form of historical data. The historical data may be analyzed to determine the client drop-off criteria 114 by the services 110 or the quality of service manager 112. In some embodiments, the historical data may be generated based on observing the connections from the clients and determining circumstances surrounding any disconnections. For example, the quality of service manager 112 may receive an indication that a connection has been terminated and additional log information to generate the client drop-off criteria 114.

The task information 116 may indicate information relating to various tasks implemented by the computing resources 118 on behalf of the clients 102, 104, and 106, according to some embodiments. The computing resources 118 may be allocated by the quality of service manager 112 based on types of tasks that are being performed for respective clients. For example, low priority tasks may have fewer computing resources 118 allocated to perform the tasks. As another example, the quality of service manager 112 may determine or adjust allocations of the computing resources 118 based on a comparison of a particular task to existing tasks being processed by the computing resources 118. The quality of service manager 112 may determine from the task information 116 that a particular existing task may take a long time to complete while a new task may be relatively smaller compared to the particular existing task. For example, the particular existing task may be a large download about 50% complete while the new task may be a significantly smaller download that can be completed in a quick manner. Thus, the quality of service manager 112 may allocate some of the computing resources 118 in order to complete the new task prior to completion of the particular existing task. In some situations, some of the computing resources 118 may be diverted away from the existing task to fulfill the new task.

The quality of service manager 112 may also be configured to determine overhead costs in reestablishing dropped connections, according to some embodiments. For example, the quality of service manager 112 may determine whether reestablishing the dropped connections results in lower or higher overhead costs than maintaining the respective connections at a lower priority or quality of service. The allocations of the computing resources 118 for the respective connections may also be based at least in part on the respective overhead costs for reestablishing dropped connections. For example, the allocations of the computing resources 118 may be adjusted to where at least some transmissions of data over a given connection may occur to mitigate the costs of having to reestablish the given connection in the event of a drop-off of the given connection. In some situations, at least some of the computing resources 118 may be repurposed for other tasks, e.g., switching contexts for the computing resources 118. Switching contexts of the computing resources 118 may include additional overhead costs due to having to stop processing for one task and having to initiate processing for another task. In some embodiments, the quality of service manager 112 may determine that overhead costs for a particular connection may satisfy a cost threshold such that the quality of service manager 112 may allow the particular connection to be dropped. For example, the cost threshold may correspond to a cost where recovery of the dropped connection may be computationally beneficial to allow other higher priority connections to be maintained by the services 110. In some embodiments, the overhead costs may also include costs associated with opening, closing, or maintaining TCP windows for data transmissions via the particular connection. For example, quality of service for the particular connection may be increased in order to maintain a larger buffer for the particular connection. As another example, acceleration time to reopen the TCP windows may also be another factor in determining the overhead costs. The quality of service manager 112 may be configured to observe scaling of the TCP windows without necessarily being able to access algorithms used for the scaling.

The clients 102, 104, and 106 may send respective service requests to the services 110 such that the services 110 may fulfill the respective service requests with respective subsets of the computing resources 118 on behalf of the clients 102, 104, and 106. For example, the services 110 may fulfill each of the respective service requests with respective subsets of computing resources 114. In some situations, fulfillment of the respective service requests may cause congestion or overload issues with the services 110. For example, the computing resources 114 may collectively be unable to fulfill the service requests without adjusting throughput from the services 110 to the clients 102, 104, and 106.

The computing resources 118 may be allocated by the services 110 to fulfill the service request, according to some embodiments. For example, the services 110 may allocate some or all of the computing resources 118 to fulfill the service request. Allocations of the computing resources 118 may include determining which of the computing resources 118 may be required to fulfill the service request. For example, the services 110 may determine that particular ones of the computing resources 118 that may be better suited for fulfilling the service request than other ones of the computing resources 118. In other situations, particular ones of the computing resources 118 may be reallocated to other clients in order to adjust prioritizations with respect to the various clients connected to the services 110. In some situations, allocation of the computing resources 118 may cause lower bandwidth throughput to certain clients in order to fulfill more service requests on the aggregate than if no adjustment to the allocation were made.

In some embodiments, the services 110 may include a data storage service that is configured to store data in the data store 120 and send data to clients via the network 150.

The computing resources 118 may include a buffer to receive and store the data during transmission to the clients.

The quality of service manager 112 may be configured to manage allocation of the computing resources 118 based on prioritization levels associated with respective clients, according to some embodiments. Initially, the prioritization levels may be established with a default level for the respective clients. In some embodiments, the quality of service manager 112 may determine prioritization levels for respective clients based on various factors. For example, the quality of service manager 112 may determine prioritization levels based on assignments, such service level agreements (SLAs) between the clients and the provider network 130. In another example, the quality of service manager 112 may determine prioritization levels based on client-specific drop-off criteria that indicates one or more conditions that tend to result in the respective client ceasing communications over the respective connection. In yet another example, the quality of service manager 112 may determine prioritization levels based on information pertaining to the respective tasks performed on behalf of the respective clients. The assignments of prioritization levels for the respective clients may be determined based on information provided by the respective clients as part of provisioning the services 110 to accept service requests from the clients 102, 104, and 106. For example, the services 110 may receive one or more initialization requests from the clients 102, 104, and 106 for provisioning with the services 110 or the provider network 130 as a whole. The initialization requests may include selections corresponding to prioritization levels for the services 110.

In one example, a high priority client may be provided with a higher quality of service with respect to other lower priority clients, while the other lower priority clients may have a minimum quality of service to fulfill service requests. For example, the lower priority clients may have a baseline amount of service fulfillment, e.g., a low bandwidth threshold, from a minimum allocation of computing resources 118, whereas the high priority client may be given a remainder of the computing resources 118 to fulfill a high priority service request. In another example, equal priority clients may have respective service requests prioritized based on respective task information 116 for each of the clients.

The network interface 116 may establish a connection to the client 102 in order to communicate information regarding the services 110, according to some embodiments. For example, the network interface 116 may status information or progress information regarding the services 110. In some embodiments, the network interface 116 may transmit data to or from the services 110 pursuant to the service request. For example, service requests to download data from the data store 120 may cause the network interface 116 to transmit the data from the data store 120 to the client 102 to fulfill the service request. The network interface 116 may transmit data to or from the services 110 may also transmit data to the client 102 to prevent timeouts from occurring. For example, the network interface 116 may be configured to transmit data in accordance with the client drop-off criteria to ensure that the connections to the clients are not timed out. The network interface 116 may establish a plurality of connections to a plurality of clients, in some embodiments. For example, the network interface 116 may establish respective connections to the client 102, the client 104, and the client 106.

After the quality of service manager 112 adjusts the allocations of the computing resources 118 for respective connections to clients, the services 110 may cause respective tasks to be implemented on behalf of respective clients at the respective allocated computing resources 118 based on the adjusted allocations. For example, the quality of service manager 112 may send an indication to the computing resources 118 to initiate fulfillment of the service requests by performing at least a portion of the tasks. The indication may include one or more of a service command, a notification, an instruction, or any other form of communication configured to cause the computing resources 118, or subsets thereof, to initiate at least a portion of the tasks pursuant to the service requests.

The quality of service manager 112 may continually adjust the allocations of the computing resources 118 based on various event triggers, according to some embodiments. In some situations, the quality of service manager 112 may determine that an evaluation time period has elapsed. For example, the quality of service manager 112 may include a timer, clock count, or action count to determine that the evaluation time period has elapsed since a previous adjustment to the computing resources 118. In other situations, the quality of service manager 112 may detect a change with respect to one or more of the plurality of connections from the clients. For example, the quality of service manager 112 may determine based on network utilization information that a connection has been added or removed, such as by a new client initiating a service request or an existing client closing a connection. As another example, the quality of service manager 112 may determine based on task information 116 that a new task has started or an existing task has been completed. Based on detecting that an event trigger has occurred, the quality of service manager 112 may readjust the allocations of the computing resources 118 based on the client drop-off criteria 114 for any remaining clients and based on the task information 116 for any remaining tasks.

Figure 2:
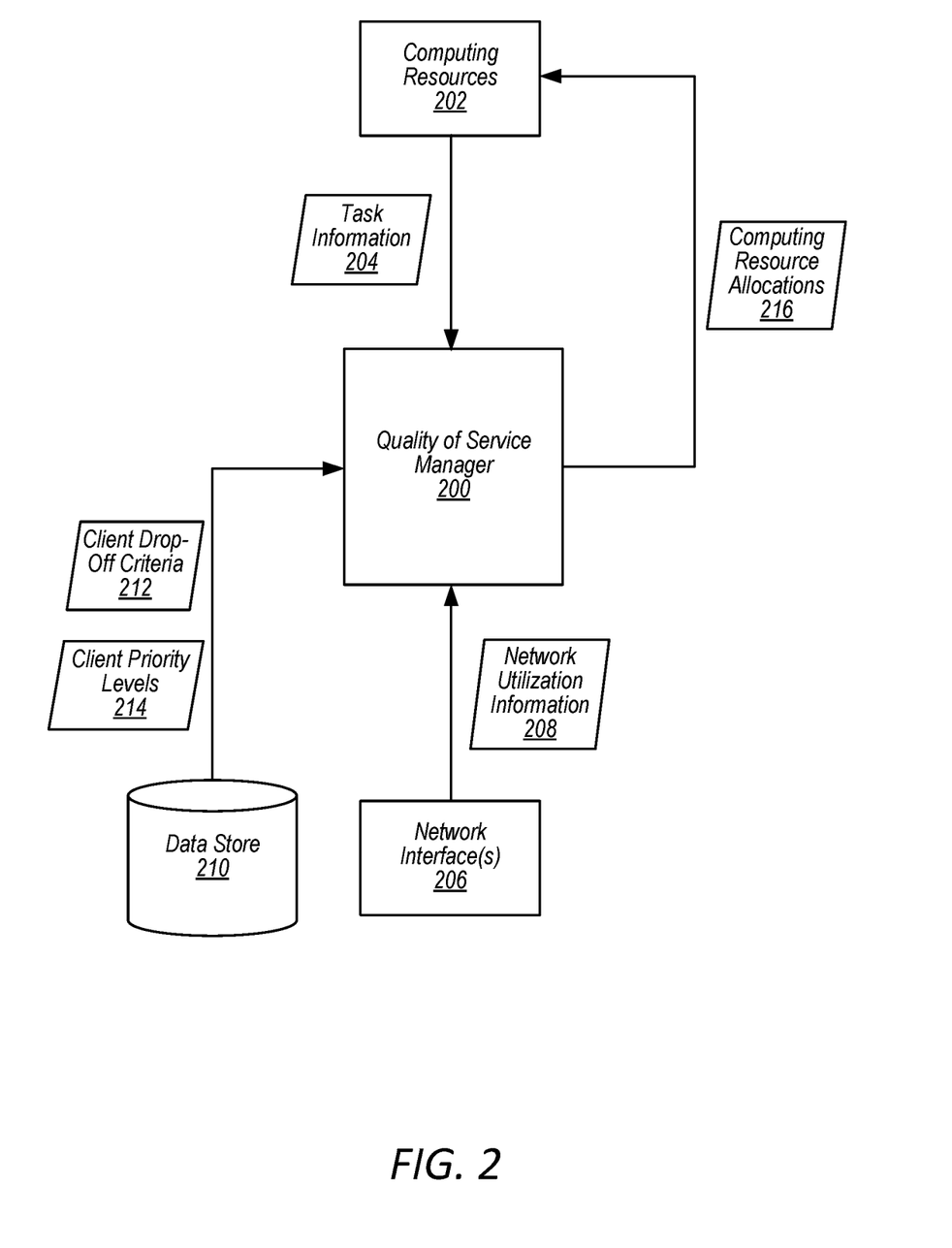
FIG. 2 illustrates a data flow diagram for a quality of service manager, according to some embodiments.

FIG. 2 illustrates a data flow diagram for a quality of service manager 200, according to some embodiments. The quality of service manager 200 may correspond to the quality of service manager 112 of FIG. 1. The quality of service manager 200 may be configured to manage quality of service for computing resources 202 configured to implement tasks for a service provider. The quality of service manager 200 may adjust computing resource allocations 216 for the computing resources 202, according to some embodiments.

The quality of service manager 200 may receive task information 204 from the computing resources 202, according to some embodiments. The task information 204 may indicate types of tasks implemented by the computing resources 202. The task information 204 may indicate a status of pending tasks implemented by the computing resources 202. The task information 204 may be continually provided to the quality of service manager 200. The task information 204 may also indicate that at least one task has been completed since a previous iteration of the task information 204 was provided to the quality of service manage 200. The task information 204 may also indicate types of tasks being implemented by the computing resources 202.

The quality of service manager 200 may be configured to determine the computing resource allocations 216 based at least in part on the task information 204, according to some embodiments. For example, the quality of service manager 200 may adjust the computing resource allocations 216 based on the types of tasks indicated in the task information 204. As another example, the quality of service manager 200 may adjust the computing resource allocations 216 based on whether tasks are ongoing or have been completed.

The quality of service manager 200 may receive network utilization information 208 from one or more network interfaces 206, according to some embodiments. The network utilization information 208 may indicate statuses regarding connections between the network interfaces 206 and clients of the service provider. For example, the network utilization information 208 may indicate that a particular client is actively connected to the service provider. As another example, the network utilization information 208 may indicate that the particular client has lost connection with the service provider. The quality of service manager 200 may determine conditions relating to lost connections from respective clients. For example, the quality of service manager 200 may determine that certain conditions were satisfied resulting in the lost connections, such as a period of time had elapsed between data transmissions from the network interfaces 206 and the clients.

The quality of service manager 200 may receive client drop-off criteria 212 and client priority levels 214 from the data store 210, according to some embodiments. The data store 210 may be configured to store the client drop-off criteria 212 and the client priority levels 214 in a database or tables for storing client data on a per-client basis. In some embodiments, the client drop-off criteria 212 may indicate conditions relating to lost connections from respective clients. For example, the client drop-off criteria 212 may indicate conditions that tend to result in the respective clients terminating, closing, or ceasing communications via their respective connections to the service provider.

The client priority levels 214 may indicate respective priority levels for respective clients. For example, the client priority levels 214 may indicate to the quality of service manager 200 that a particular client may require additional resources of the computing resources 202 or if the particular client is subject to traffic shaping or throttling. The client priority levels 214 may be during an onboarding process for the respective clients. In some embodiments, the client priority levels 214 may be determined according to one or more SLAs between the clients and the service provider.

The quality of service manager 200 may one or more of the task information 204, the network utilization information 208, the client drop-off criteria 212, or the client priority levels 214 as the bases of determining the computing resource allocations 216. For example, the quality of service manager 200 may use indications of the task types from the task information 204 and timeout values from the client drop-off criteria 212 to determine the computing resource allocations 216 in order to prevent connections from being dropped by the clients while also managing throughput of the computing resources 202 to the clients. The quality of service manager 200 may then effect changes to the computing resources 202 based on the computing resource allocations 216. For example, the computing resources 202 may send information indicating the computing resource allocations 216 to the computing resources 202 to cause the computing resources 202 to be reallocated to perform the tasks on behalf of the clients.

Figure 3:
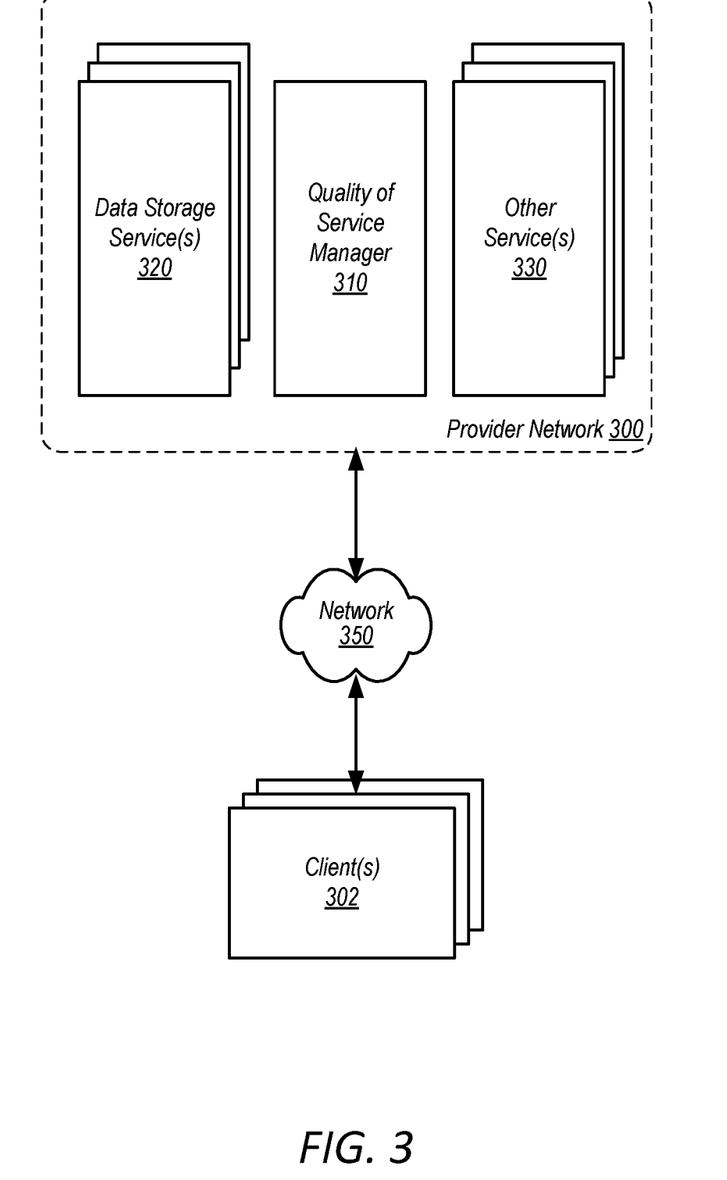
FIG. 3 illustrates a block diagram of a provider network, according to some embodiments.

FIG. 3 illustrates a block diagram of a provider network 300, according to some embodiments. The provider network 300 may be configured to provide various services to one or more clients 302 via a network 350.

The services may include one or more data storage services 320 or other services 330. The data storage services 320 may be specialized type of compute service that is provided to the clients 302. The other services 330 may include other compute services, such as data processing, analytics, data mining, hosting, machine learning, or other services provided by a provider network.

The clients 302 may send one or more service requests to the provider network 300 which may be fulfilled by the data storage services 320 or the other services 330, according to some embodiments. For example, the data storage services 320 or the other services 330 may respond to the service requests and initiate one or more tasks using resources of the provider network 300 to fulfill the service requests. In some embodiments, the data storage services 320 or the other services 330 may communicate to respective ones of the clients 302 via the network 350. For example, the data storage services 320 or the other services 330 may transmit data to the clients 302 responsive to service requests from the clients 302.

The clients 302 may connect to the provider network 300 to access the data storage services 320 and/or the other services 330. Simultaneous connections between the clients 302 may cause congestion within the provider network 300 or via the network 350, in some situations. The services may be managed by a quality of service manager 310 in order to alleviate congestion such that the data storage services 320 or the other services 330 may fulfill service requests from the clients 302, according to some embodiments. The quality of service manager 310 may correspond to the quality of service manager 112 of FIG. 1 or the quality of service manager 200 of FIG. 2, according to some embodiments.

The quality of service manager 310 may be configured to adjust allocations of computing resources for fulfilling service requests by the data storage services 320 or the other services 330, according to some embodiments. For example, the quality of service manager 310 may allocate respective subsets of the computing resources to respective clients 302 in order to fulfill the service requests from the clients 302. The allocation of the computing resources may be determined based on client drop-off criteria, task information for tasks relating to the service requests, network utilization information, client prioritization levels, or other transactional information.

Figure 4:
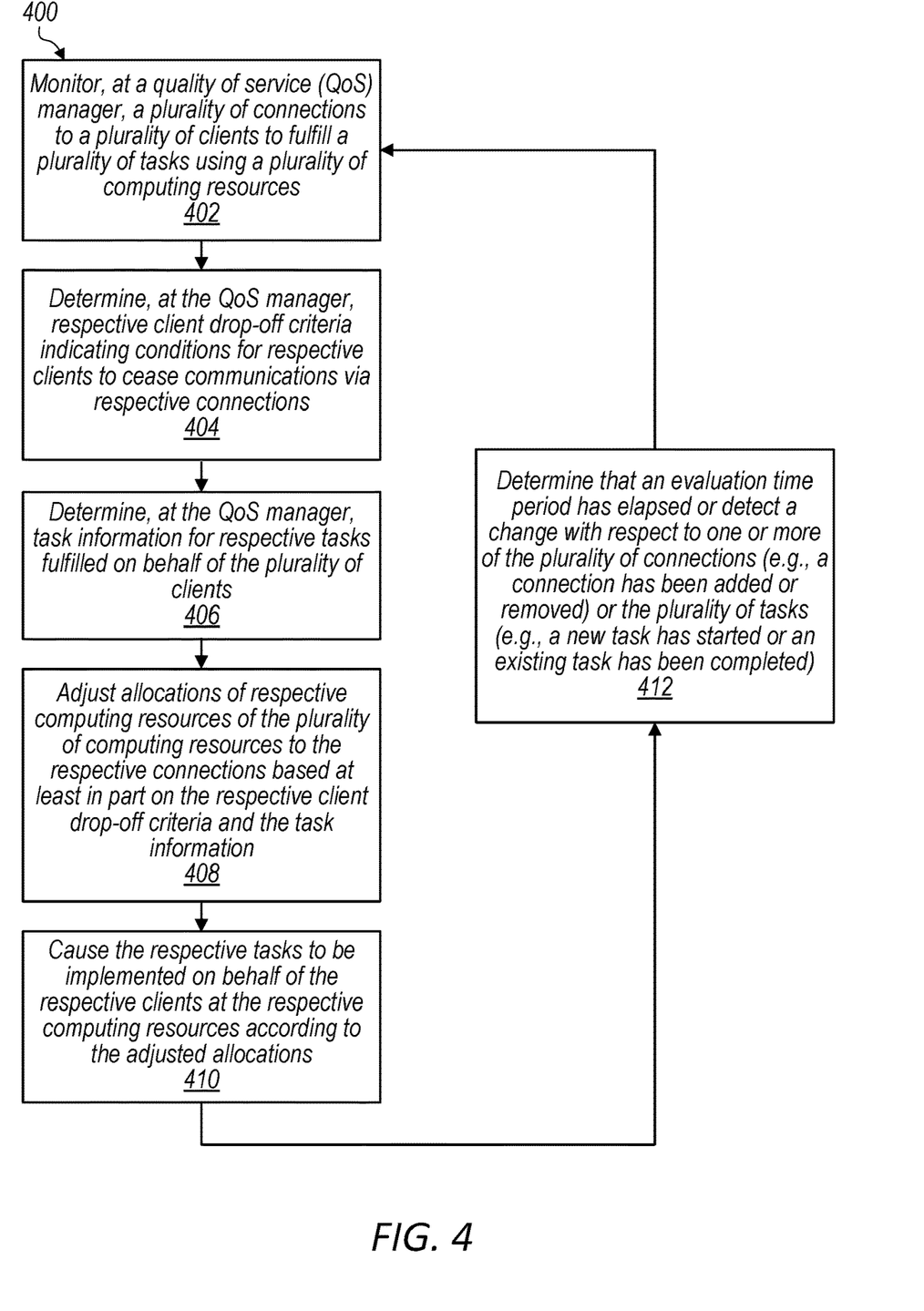
FIG. 4 illustrates a flowchart diagram for a method for managing quality of service based on client-specific criteria, according to some embodiments.

FIG. 4 illustrates a flowchart diagram for a method 400 for managing quality of service based on client-specific criteria, according to some embodiments. The method 400 may be performed by the quality of service manager 112 of FIG. 1, the quality of service manager 200 of FIG. 2, or the quality of service manager 310 of FIG. 3. The method 400 may also be implemented as computer-executable instructions that cause one or more processors to perform various operations for the method 400.

The method 400 includes monitoring, at a quality of service (QOS) manager, a plurality of connections to a plurality of clients to fulfill a plurality of tasks using a plurality of computing resources, at 402. The plurality of clients may correspond to the clients 102, 104, and 106 of FIG. 1 or the clients 302 of FIG. 3, according to some embodiments. The plurality of computing resources may correspond to the computing resources 118 of FIG. 1 or the computing resources 202 of FIG. 2. In some embodiments, the quality of service manager may include monitoring functionality configured to track the plurality of connections for the plurality of clients. For example, the quality of service manager may include one or more network traffic monitors configured to observe throughput or traffic via network interfaces implemented on behalf of the services. In some embodiments, the quality of service manager may determine which of the plurality of clients are connected to the service and utilizing computing resources to perform the tasks.

The method 400 also includes determining, at the QoS manager, respective client drop-off criteria indicating conditions for respective clients to cease communications via respective connections, at 404. In some embodiments, the client drop-off criteria may indicate conditions that, when occurring, tend to result in respective ones of the clients ceasing communications. For example, the conditions may indicate situations which have resulted in the clients closing the connection, terminating the connection, timing out of the connection, or otherwise ceasing communications. In some situations, the client drop-off criteria may indicate a timeout value indicating a period of inactivity on the respective connection that elapses for the respective client to close the respective connection.

The method 400 further includes determining, at the QoS manager, task information for respective tasks fulfilled on behalf of the plurality of clients, at 406. In some embodiments, the QoS manager may receive the task information from the plurality of computing resources. For example, the plurality of computing resources may report, to the QoS manager, statuses for the tasks implemented by the plurality of computing resources for fulfilling the service requests. In other embodiments, the QoS manager may monitor the plurality of computing resources to determine the task information. For example, the QoS manager may include a monitoring services configured to track the tasks implemented by the plurality of computing resources.

The method 400 also includes adjusting allocations of respective computing resources of the plurality of computing resources to the respective connections based at least in part on the respective client drop-off criteria and the task information, at 408. In some embodiments, the QoS manager may be configured to determine and adjust the allocations of the respective computing resources in order to implement quality of service management. For example, the QoS manager may accommodate potential congestion or overloading of the services by reducing throughput to some clients in order to ensure quality of service across as many clients as possible. In some situations, the QoS manager may determine that particular clients may be subject to disconnection due to prioritization of other clients or their respective tasks. For example, the QoS manager may determine that a particular client may have overhead costs that satisfy a cost threshold for efficiently restoring a disconnected connection. The cost threshold may indicate that restoration of the connection may be computationally efficient to restore. The QoS manager may be less like to allow the connection to be dropped when the overhead costs are greater than the cost threshold.

The method 400 yet also includes causing the respective tasks to be implemented on behalf of the respective clients at the respective computing resources according to the adjusted allocations, at 410. In some embodiments, the QoS manager may be configured to instruct the computing resources to implement the respective tasks on behalf of the respective clients. For example, the QoS manager may send indications of the adjusted allocations to the computing resources in order to cause the computing resources to adjust allocations for the respective clients. The plurality of computing resources may receive instructions and indications from the QOS manager to allocate the computing resources for implementing the tasks on behalf of the respective clients.

The method 400 further includes determining that an evaluation time period has elapsed or detect a change with respect to one or more of the plurality of connections or the plurality of tasks, at 412. The QoS manager may detect that a reallocation event has occurred and may reallocate the computing resources based on an indication of the reallocation event. In some embodiments, the QoS manager may perform a periodic evaluation of the allocations of the respective computing resources. For example, the QoS manager may perform the periodic evaluation when the evaluation time period elapses. In other embodiments, the QoS manager may detect a change to one or more of the plurality of connections, such as a connection having been added or removed. For example, the QoS manager may receive network utilization information from one or more network interfaces to determine whether connections via the network interfaces are active, inactive, or disconnected. In some embodiments, the QoS manager may also determine a change to the plurality of tasks, such as whether a new task has started or an existing task has been completed. For example, the QoS manager may receive task information from the plurality of computing resources that indicates statuses of the tasks implemented on behalf of clients at the plurality of computing resources.

Based on a determination that the evaluation time period has elapsed or a change with respect to one or more connection or task, the method 400 may return to 404 to further adjust the allocations of the respective computing resources of the plurality of computing resources. In some embodiments, the QoS manager may continually adjust the allocations of the respective computing resources such that quality of service is continually managed while the computing resources implement tasks on behalf of clients.

Figure 5:
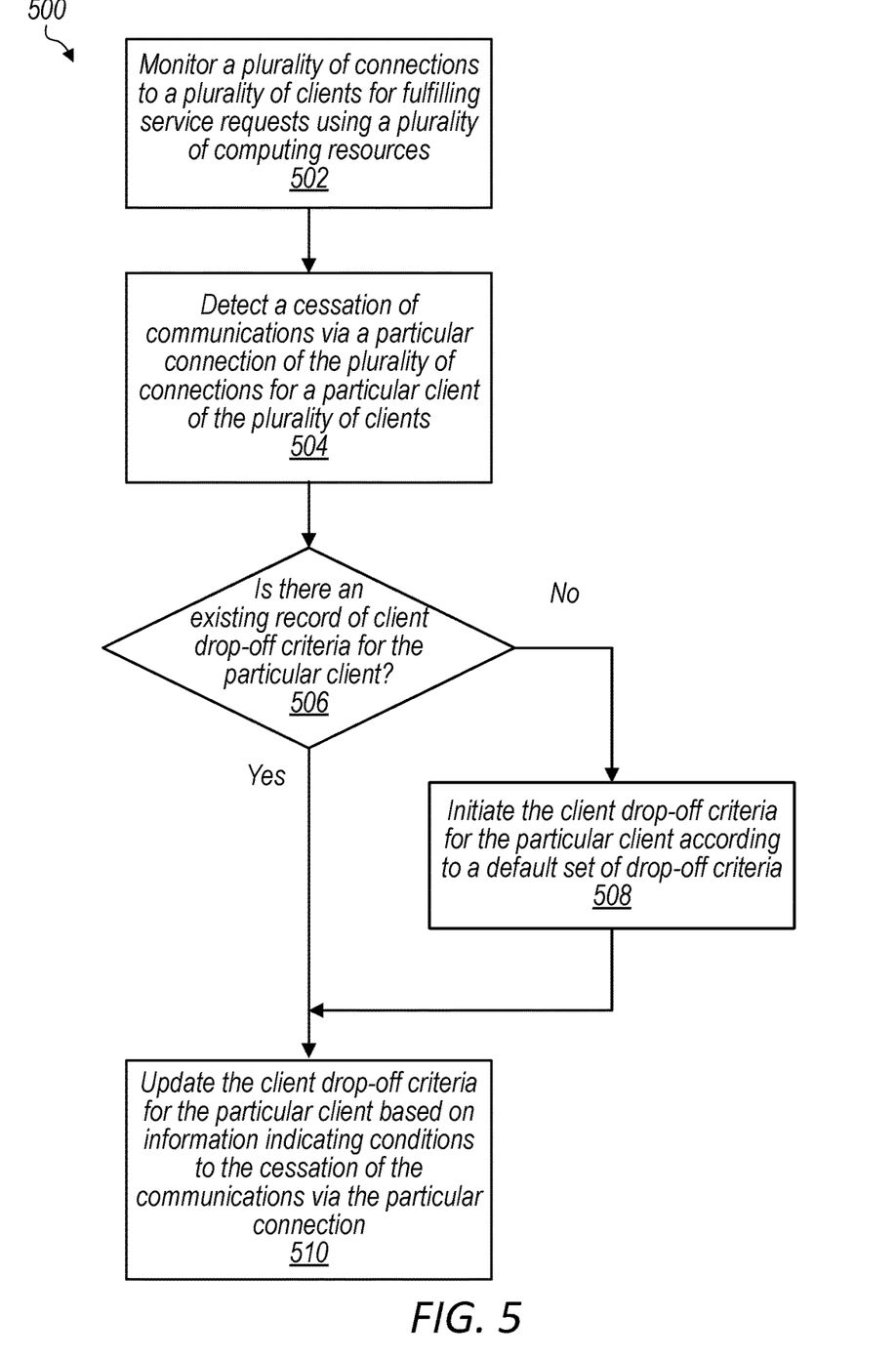
FIG. 5 illustrates a flowchart diagram for a method for updating client drop-off criteria for a plurality of clients, according to some embodiments.

FIG. 5 illustrates a flowchart diagram for a method 500 for updating client drop-off criteria for a plurality of clients, according to some embodiments. The method 500 may be performed by a quality of service manager, such as the quality of service manager 112 of FIG. 1, the quality of service manager 200 of FIG. 2, or the quality of service manager 310 of FIG. 3.

The method 500 includes monitoring a plurality of connections to a plurality of clients for fulfilling service requests using a plurality of computing resources, at 502. The plurality of clients may correspond to the clients 102, 104, and 106 of FIG. 1 or the clients 302 of FIG. 3, according to some embodiments. The plurality of computing resources may correspond to the computing resources 118 of FIG. 1 or the computing resources 202 of FIG. 2. In some embodiments, the quality of service manager may include monitoring functionality configured to track the plurality of connections for the plurality of clients. For example, the quality of service manager may include one or more network traffic monitors configured to observe throughput or traffic via network interfaces implemented on behalf of the services. In some embodiments, the quality of service manager may determine which of the plurality of clients are connected to the service and utilizing computing resources to perform the tasks.

The method 500 also includes detecting a cessation of communications via a particular connection of the plurality of connections for a particular client of the plurality of clients, at 504. In various embodiments, the cessation of communications may include the particular client affecting the communications via the particular connection such as by one or more of terminating the connection, timing out of the connection, dropping off of the respective connection, or otherwise closing the respective connection. The particular client may cease communications based on the particular client detecting certain conditions surrounding the particular connection. For example, the particular client may cease communications based on determining that a period of inactivity has elapsed for the particular connection, such that no activity has occurred via the particular connection.

The method 500 further includes determining whether there is an existing record of client drop-off criteria for the particular client, at 506. The client drop-off criteria may correspond to the client drop-off criteria 114 of FIG. 1 or the client drop-off criteria 212 of FIG. 2, according to some embodiments. The client drop-off criteria may also be used by the quality of service manager to adjust allocations of computing resources for implementing tasks on behalf of clients, such as in 404 or 408 of FIG. 4. In some embodiments, the quality of service manager may query a database of client records for existing client drop-off criteria for the particular client. For example, the quality of service manager may query a database stored managed in a data store, such as the data store 120 of FIG. 1 or the data store 210 of FIG. 2, or the data storage services 320 of FIG. 3. Based on a determination that there is no existing record of client drop-off criteria for the particular client, the method may continue to 508. Based on a determination that there is an existing record of client drop-off criteria for the particular client, the method may continue to 510.

The method 500 also includes based on a determination that there is no existing record of client drop-off criteria for the particular client, initiating the client drop-off criteria for the particular client according to a default set of drop-off criteria, at 508. In some embodiments, the client drop-off criteria may be initiated with a default set of criteria. The default set of criteria may include a default timeout value that may be changed based on determining an actual timeout value for the particular client.

The method 500 further includes updating the client drop-off criteria for the particular client based on information indicating conditions to the cessation of the communications via the particular connection, at 510. In some embodiments, the quality of service manager may cause the client drop-off criteria to be updated based on sending a notification to the data store indicating changes to the client drop-off criteria. In other embodiments, the quality of service manager may update the record of the client drop-off criteria stored on the quality of service manager. The quality of service manager may determine the conditions to the cessation of the communications based on usage logs, such as task information or network utilization information. For example, the quality of service manager may determine the conditions based on a usage log indicating that no traffic had occurred over a period of time leading to the particular client terminating the particular connection. As another example, the quality of service manager may determine that a threshold number of connections were attempted simultaneously without response such that the particular connection refused subsequent connection requests.

Figure 6:
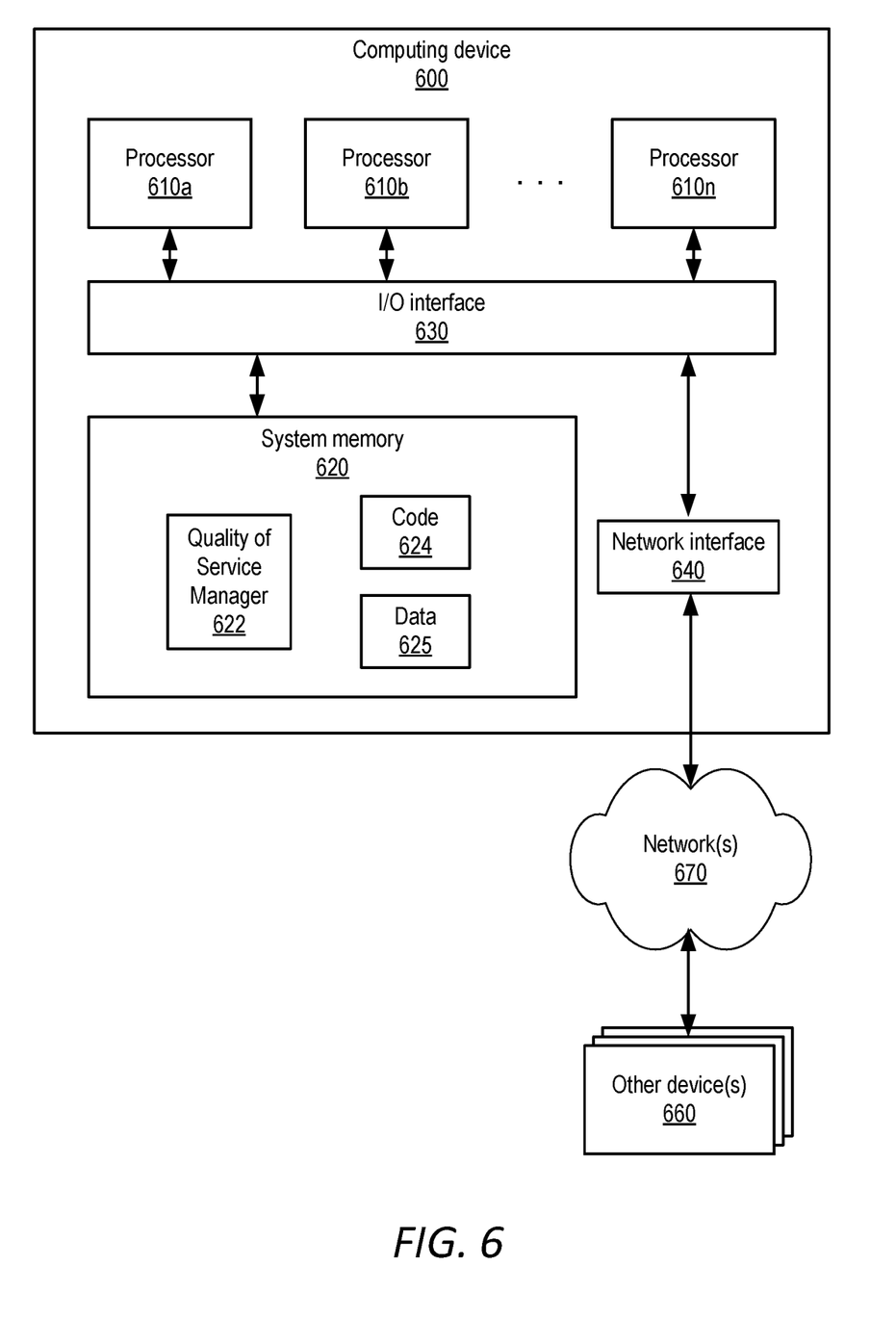
FIG. 6 is a block diagram illustrating an example computer system that may be used in some embodiments.

Any of various computer systems may be configured to implement techniques for managing memory compression in a secure manner, as disclosed herein. For example, FIG. 6 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 600 such as that illustrated in FIG. 6 or one or more components of the computer system 600 that function in a same or similar way as described for the computer system 600.

In the illustrated embodiment, computer system 600 includes one or more processors 610 coupled to a system memory 620 via an input/output (I/O) interface 630. Computer system 600 further includes a network interface 640 coupled to I/O interface 630. In some embodiments, computer system 600 may be illustrative of servers implementing enterprise logic or downloadable application, while in other embodiments servers may include more, fewer, or different elements than computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor 610. In various embodiments, system memory 620 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 620 as program instructions 624. In some embodiments, system memory 620 may include data 625 which may be configured as described herein. In some embodiments, system memory 620 may include quality of service manager 622. For example, quality of service manager 622 may perform the functions of quality of service manager 112 of the services 110 of FIG. 1 or the functions of quality of service manager 200 of FIG. 2.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other devices attached to a network, such as between client devices (e.g., 660, etc.) and other computer systems, or among hosts, for example. In particular, network interface 640 may be configured to allow communication between computer system 600 and/or various other devices 660 (e.g., I/O devices). Other devices 660 may include scanning devices, display devices, input devices and/or other communication devices, as described herein. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks 670, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 600 via I/O interface 630. A computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, which may be implemented via network interface 640.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 600, including one or more processors 610 and various other devices (though in some embodiments, a computer system 600 implementing an I/O device 650 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 600. In general, an I/O device (e.g., cursor control device, keyboard, or display(s) may be any device that can communicate with elements of computing system 600.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    a plurality of computing resources configured to provide services implemented at a provider network;
    one or more network interfaces configured to establish a plurality of connections to perform a plurality of tasks on behalf of a plurality of clients connected via the plurality of connections using the plurality of computing resources;
    one or more processors and a memory storing instructions to implement a quality of service (QoS) manager configured to:
        detect ceased connections of the plurality of connections for respective clients of the plurality of clients;
        determine respective historical client drop-off criteria indicating detected conditions for when the respective clients ceased communications via respective connections of the ceased connections;
        determine task information for respective pending or ongoing tasks of the respective clients, wherein the respective pending or ongoing tasks are for respective active connections of the plurality of connections, and wherein the task information indicates one or more of a size of the respective pending or ongoing tasks, a resource requirement for the respective pending or ongoing tasks, or priority information for the respective pending or ongoing tasks;
        adjust, for the respective active connections, allocations of respective quantities of computing resources of the plurality of computing resources wherein:
            the respective quantities of computing resources are used to process the respective pending or ongoing tasks;
            the allocations are adjusted based at least in part on respective historical client drop-off criteria for previously disconnected connections and the task information; and
            the adjustment of allocations lowers a bandwidth throughput for a particular client by reallocating a particular computing resource of the plurality of computing resources to a different client of the plurality of clients, wherein the lowering of the bandwidth throughput increases an aggregate number of respective pending or ongoing tasks able to be processed using the plurality of computing resources; and cause the respective quantities of computing resources to implement the respective pending or ongoing tasks on behalf of the respective clients according to the adjusted allocations.

2. The system of claim 1, wherein the QoS manager is further configured to:

determine respective prioritization levels for the respective clients, wherein adjustment of the allocations of the respective quantities of computing resources is further based at least in part on the respective prioritization levels.

3. The system of claim 1, wherein the QoS manager is further configured to:

determine respective overhead costs for reestablishing ceased connections of the plurality of connections, wherein adjustment of the allocations of the respective quantities of computing resources for the respective active connections is further based at least in part on the respective overhead costs for reestablishing ceased connections.

4. The system of claim 1, wherein the QoS manager is further configured to:

determine the respective historical client drop-off criteria based at least in part on historical data indicating previous disconnections of other connections to the respective clients; and store the respective historical client drop-off criteria for the respective clients to a data store.

5. The system of claim 1, wherein the respective historical client drop-off criteria include a timeout value indicating a period of inactivity on the respective connection that elapses for the respective client to close the respective connection.

6. A method, comprising:

performing, with one or more computing devices configured to implement a quality of service (QoS) manager:

detecting ceased connections of a plurality of connections for respective clients of a plurality of clients;

determining respective historical client drop-off criteria indicating detected conditions for when the respective clients ceased communications via respective connections of the ceased connections;

determining task information for respective pending or ongoing tasks of the respective clients, wherein the respective pending or ongoing tasks are for respective active connections of the plurality of connections, and wherein the task information indicates one or more of a size of the respective pending or ongoing tasks, a resource requirement for implementing the respective pending or ongoing tasks, or a priority of the respective pending or ongoing tasks;

adjusting, for the respective active connections, allocations of respective quantities of computing resources of a plurality of computing resources wherein:

the respective quantities of computing resources are used to process the respective pending or ongoing tasks;

the allocations are adjusted based at least in part on the respective historical client drop-off criteria for previously disconnected connections and the task information; and the adjusting of the allocations lowers a bandwidth throughput for a particular client by reallocating a particular computing resource of the plurality of computing resources to a different client of the plurality of clients, wherein the lowering of the bandwidth throughput increases an aggregate number of the respective pending or ongoing tasks able to be processed using the plurality of computing resources; and causing the respective quantities of computing resources to implement the respective pending or ongoing tasks on behalf of the respective clients according to the adjusted allocations.

7. The method of claim 6, further comprising:

receiving an indication of a reallocation event;

readjusting the allocations of the respective quantities of computing resources for the respective active connections based at least in part on the reallocation event, the respective client drop-off criteria, and the task information; and causing the respective quantities of computing resources to implement the respective pending or ongoing tasks on behalf of the respective clients according to the readjusted allocations.

8. The method of claim 7, wherein the reallocation event comprises completion of a particular task of the plurality of tasks, the method further comprising:

closing a particular connection of the plurality of connections corresponding to the particular task.

9. The method of claim 7, wherein the reallocation event comprises evaluating current workloads across the plurality of computing resources.

10. The method of claim 6, further comprising:

determining respective overhead costs for reestablishing ceased connections of the plurality of connections, wherein adjusting the allocations of the respective quantities of computing resources for the respective active connections is further based at least in part on the respective overhead costs for reestablishing ceased connections.

11. The method of claim 6, further comprising:

determining respective prioritization levels for the respective clients, wherein adjusting the allocations of the respective quantities of computing resources is further based at least in part on the respective prioritization levels.

12. The method of claim 6, further comprising:

determining the respective historical client drop-off criteria based at least in part on historical data indicating previous disconnections of other connections to the respective clients; and storing the respective historical client drop-off criteria and for the respective clients to a data store.

13. The method of claim 6, wherein the respective historical client drop-off criteria include a timeout value indicating a period of inactivity on the respective connections that elapses for the respective clients to close the respective connections.

14. One or more non-transitory computer-readable storage media storing instructions that, when executed on or across one or more processors, cause the one or more processors to:

detect ceased connections of a plurality of connections for respective clients of a plurality of clients;

determine respective historical client drop-off criteria indicating detected conditions for when the respective clients ceased communications via respective connections of the ceased connections;

determine task information for respective pending or ongoing tasks of the respective clients, wherein the respective pending or ongoing tasks are for respective active connections of the plurality of connections, and wherein the task information indicates one or more of a size of the respective pending or ongoing tasks, a resource requirement for the respective pending or ongoing tasks, or priority information for the respective pending or ongoing tasks;

adjust, for the respective active connections, allocations of respective quantities of computing resources of a plurality of computing resources wherein:

the respective quantities of the computing resources are used to process the respective pending or ongoing tasks;

the allocations are adjusted based at least in part on the respective historical client drop-off criteria for previously disconnected connections and the task information; and the adjustment of the allocations lowers a bandwidth throughput for a particular client by reallocating a particular computing resource of the plurality of computing resources to a different client of the plurality of clients, wherein the lowering of the bandwidth throughput increases an aggregate number of the respective pending or ongoing tasks able to be processed using the plurality of computing resources; and cause the respective quantities of computing resources to implement the respective pending or ongoing tasks on behalf of the respective clients according to the adjusted allocations.

15. The one or more non-transitory computer-readable storage media of claim 14, further comprising instructions that, when executed on or across the one or more processors, cause the one or more processors to:

in response to an indication of a reallocation event, readjust the allocations of the respective quantities of computing resources for the respective active connections based at least in part on the reallocation event, the respective historical client drop-off criteria, and the task information; and cause the respective quantities of computing resources to implement the respective pending or ongoing tasks on behalf of the respective clients according to the readjusted allocations.

16. The one or more non-transitory computer-readable storage media of claim 14, further comprising instructions that, when executed on or across the one or more processors, cause the one or more processors to:

determine respective overhead costs for maintaining transmission control protocol windows of the respective active connections, wherein adjustment of the allocations of the respective quantities of computing resources for the respective active connections is further based at least in part on the respective overhead costs for maintaining the transmission control protocol windows.

17. The one or more non-transitory computer-readable storage media of claim 16, further comprising instructions that, when executed on or across the one or more processors, cause the one or more processors to:

send a data block to the respective client via the respective active connection to maintain the respective transmission control protocol window.

18. The one or more non-transitory computer-readable storage media of claim 17, wherein the respective historical client drop-off criteria include a timeout value indicating a period of inactivity on the respective connection that elapses for the respective client to close the respective connection.

19. The one or more non-transitory computer-readable storage media of claim 14, further comprising instructions that, when executed on or across the one or more processors, cause the one or more processors to:

determine respective prioritization levels for the respective clients, wherein adjustment of the allocations of the respective quantities of computing resources is further based at least in part on the respective prioritization levels.

20. The one or more non-transitory computer-readable storage media of claim 14, further comprising instructions that, when executed on or across the one or more processors, cause the one or more processors to:

determine the respective historical client drop-off criteria based at least in part on historical data indicating previous disconnections of other connections to the respective clients; and store the respective historical client drop-off criteria for the respective clients to a data store.

* * * * *